No. 722,832. PATENTED MAR. 17, 1903.
C. FRESENIUS.
METHOD OF PURIFYING FATS.
APPLICATION FILED SEPT. 22, 1902.
NO MODEL.
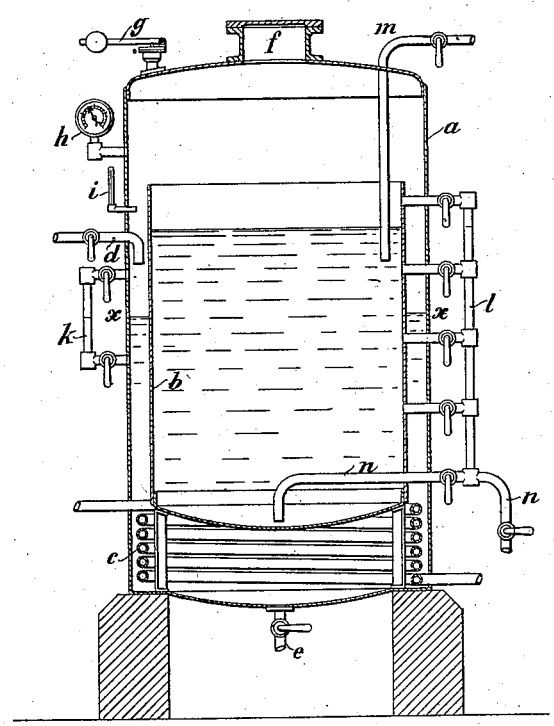

UNITED STATES PATENT OFFICE.

CARL FRESENIUS, OF OFFENBACH-ON-THE-MAIN, GERMANY.

METHOD OF PURIFYING FATS.

SPECIFICATION forming part of Letters Patent No. 722,832, dated March 17, 1903.

Application filed September 22, 1902. Serial No. 124,448. (No specimens.)

*To all whom it may concern:*

Be it known that I, CARL FRESENIUS, a citizen of the German Empire, residing at Offenbach-on-the-Main, in the Grand Duchy of Hesse, Germany, have invented certain new and useful Improvements in or Relating to the Purification of Fats and Oils, Particularly of Cocoanut-Oil; and I do hereby declare the following to be a full, clear, and exact description of the invention, such as will enable others skilled in the art to which it appertains to make and use the same.

In the purification of fat oils and fats for eating purposes it is important in the first place to remove the free fatty acids. To this end suitable solutions of alkalies and alkaline earths are used. In order to precipitate the enormous soap emulsion thus produced, particularly if alkaline earths, such as lime, &c., be used, it has hitherto been necessary to heat the masses for a long time up to 100° centigrade. Moreover, for the removal of the free fatty acids of the oils and fats larger quantities of alkalies have, as a rule, been used than are theoretically required for the chemical reaction. These quantities of alkalies attack organic substances more or less, but particularly at a high temperature. This action is diminished or the substances having odor or flavor produced thereby are rendered innocuous by means of pure fresh carbon, &c. Fats and oils which have not been subjected to purification in the presence of preventive means against the injurious influence of the product of decomposition, either during or shortly after their production, can never comply with the high conditions requisite in articles of food, even if they are repeatedly purified afterward. This fact is often the drawback in the production of oils and fats for eating purposes.

In the drawing the figure is a vertical section through the apparatus used in carrying out this invention.

I have discovered that the soap emulsion produced upon the addition of alkalies can rapidly be precipitated and a more complete binding of the free fatty acids can be obtained if the mixtures are subjected for a short time to pressure in a closed vessel above the pressure of the atmosphere until the mass has attained a heat corresponding to the pressure. In order to prevent the injurious influence of air, heat, pressure, &c., a preventive means—as, for instance, pure fresh carbon or similarly-acting substances—is first added. The action of the carbon, &c., as a means for preventing the injurious influence of air, heat, and pressure (the latter being merely inclosed heat in this case) may be explained as follows: The small quantities of pure carbon or coal-dust and the like which serve as protecting means during this temporary treatment surround the oil and fat and should therefore be added simultaneously with the alkalies before the heating, and consequently before the action of hot air, in order to protect the oils and fats against damage by the oxygen of the air and the organic products of decomposition caused or favored by the alkalies, so as to prevent, as far as possible, the fats becoming rancid—that is, acquiring a bad taste and smell. Infusorial earth or fullers' earth may and under certain circumstances must be substituted for the carbon. In the necessary final treatment with compressed steam of the oils and fats first freed from fatty acids minimum traces of alkalies remaining from the first treatment must be retained in or added to fats and oils rich in stearin, and particularly to such animal fats and oils, in order to render the decomposition of traces of these fats harmless by saponification.

The usual final treatment of the oils and fats with larger quantities of carbon or other color-removing means and filtrations is not identical with the present method either as regards the manner of using the carbon or its action.

A vessel $b$ for the fat or oil is provided and is arranged inside a closed outer vessel $a$. The vessel $a$ is provided with a manhole $f$, a safety-valve $g$, a pressure-gage $h$, a thermometer $i$, a water-inlet pipe $d$, a water-gage $k$, and a water-outlet pipe $e$, all of which parts are of any approved construction. A steam heating-coil $c$ is arranged in the lower part of the vessel $a$, and water is admitted to the said vessel until it reaches the water-line or level $x\ x$. The inner vessel $b$ is provided with a series of gages $l$ for indicating the height of the various layers of its contents. It has also an inlet-pipe m and an outlet-pipe n.

In carrying out the invention one thousand pounds of oil are mixed with eleven pounds of charcoal or any other purifying agent which is the equivalent of charcoal. A neutralizing solution of lime is then added in a quantity sufficient to saponify the oil and the emulsion is well stirred. The emulsion is admitted to the vessel b through the pipe m. Steam is admitted to the coil c at a pressure sufficient to raise the contents of the vessel b to a temperature of about 300° Fahrenheit, thereby forming a pressure in the vessel a of about fifty-five pounds above the pressure of the atmosphere. The emulsion is subjected to this pressure for about one hour, and the whole is then allowed to cool.

What I claim is—

A method of purifying oils and fats, which consists in first mixing the oil or fat with an alkali and a purifying agent, and then subjecting the emulsion to heat under a pressure of about fifty-five pounds above the pressure of the atmosphere, substantially as set forth.

In testimony whereof I affix my signature in presence of two witnesses.

CARL FRESENIUS.

Witnesses:
 CARL SCHMITT,
 GUSTAV SINNHOLD.